US006732800B2

(12) United States Patent
Acock et al.

(10) Patent No.: US 6,732,800 B2
(45) Date of Patent: May 11, 2004

(54) METHOD OF COMPLETING A WELL IN AN UNCONSOLIDATED FORMATION

(75) Inventors: Andrew Acock, Sugar Land, TX (US); Steve Hoover, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/167,880

(22) Filed: Jun. 12, 2002

(65) Prior Publication Data

US 2003/0230408 A1 Dec. 18, 2003

(51) Int. Cl.[7] .............................................. E21B 43/26
(52) U.S. Cl. ...................... 166/308; 166/295; 166/280
(58) Field of Search ............................. 166/250.1, 278, 166/279, 280, 281, 295, 297, 298, 308

(56) References Cited

U.S. PATENT DOCUMENTS

| | | | | |
|---|---|---|---|---|
| 3,075,581 A | * | 1/1963 | Kern | 166/280 |
| 4,291,766 A | | 9/1981 | Davies et al. | 166/276 |
| 4,427,069 A | | 1/1984 | Friedman | 166/295 |
| 4,669,543 A | | 6/1987 | Young | 166/276 |
| 5,054,554 A | * | 10/1991 | Pearson | 166/280 |
| 5,165,475 A | * | 11/1992 | Strubhar et al. | 166/276 |
| 5,199,492 A | | 4/1993 | Surles et al. | 166/295 |
| 5,507,342 A | * | 4/1996 | Copeland et al. | 166/279 |
| 5,547,023 A | * | 8/1996 | McDaniel et al. | 166/280 |
| 5,551,514 A | | 9/1996 | Nelson et al. | 166/280 |
| 5,597,043 A | * | 1/1997 | Stadulis | 166/280 |
| 5,791,415 A | * | 8/1998 | Nguyen et al. | 166/280 |
| 5,806,593 A | | 9/1998 | Surles | 166/270 |
| 5,813,463 A | * | 9/1998 | Stadulis | 166/280 |
| RE36,466 E | | 12/1999 | Nelson et al. | 166/280 |
| 6,059,032 A | * | 5/2000 | Jones | 166/278 |
| 6,172,011 B1 | * | 1/2001 | Card et al. | 507/204 |
| 6,330,914 B1 | * | 12/2001 | Hocking et al. | 166/250.1 |
| 6,450,260 B1 | * | 9/2002 | James et al. | 166/277 |

FOREIGN PATENT DOCUMENTS

| | | | |
|---|---|---|---|
| GB | 2352259 | 1/2001 | |
| WO | WO 02/04784 | 1/2002 | 33/138 |

OTHER PUBLICATIONS

Pitoni E., et al., *Screenless Completions: Cost–Effective Sand Control in the Adriatic Sea*, SPE Paper 58787 presented at the 2000 SPE International Symposium on Formation Damage Control held in Lafayette, Louisiana Feb. 23–24, 2000.

Norris M.R. et al., *Multiple Proppant Fracturing Of A Horizontal Wellbore: An Integration Of Two Technologies*, SPE Paper 38699 presented at the 1996 SPE European Petroleum Conference held in Milan, Italy, Oct. 22–24, 1996.

Malone, B.P. et al., *Start–up of a TSO Fracturing Campaign in a Shallow, Heavy Oil Steamflood*, SPE Paper 38096 presented at the 1997 Asia Pacific Oil and Gas Conference held in Kuala Lumpur, Malaysia Apr. 14–16, 1997.

(List continued on next page.)

*Primary Examiner*—David Bagnell
*Assistant Examiner*—Daniel P Stephenson
(74) *Attorney, Agent, or Firm*—Robin Nava; Brigitte L Echols; John Ryberg

(57) ABSTRACT

Herein is described a method of completing an interval of a cased well drilled through incompetent formation. This method includes a combination of three successive operations: zero-degree phasing perforation of a relatively small portion of the interval to be completed, consolidation of the formation zone around the perforations and injection of a propped fracturing fluid above fracture pressure to create a gap between the cement and the borehole and pack this gap with a proppant held by a proppant flowback-retention agent.

19 Claims, 2 Drawing Sheets

OTHER PUBLICATIONS

Putra, P.H. et al., *TSO Frac–Packing: Pilot Evaluation to Full–Scale Operations in a Shallow Unconsolidated Heavy Oil Reservoir*, SPE Paper 37533 presented at the 1997 Spe International Thermal Operations & Heavy Oil Symposium held in Bakersfield, California Feb. 10–12, 1997.

Kirby R. L. et al., *Screenless Frac Pack Completions Utilizing Resin Coated Sand in the Gulf of Mexico*, SPE Paper 30467 present at the 1995 SPE Annual Technical Conference with Exhibition held in Dallas, Texas Oct. 22–25, 1995.

Parlar, M., et al., *New Chemistry and Improved Placement Practices Enhance Resin Consolidation: Case Histories From the Gulf of Mexico*, SPE Paper 39435 presented at the 1998 SPE International Symposium on Formation Damage Control held in Lafayette, Louisiana Feb. 18–19, 1998.

Karian, M. A. et al., *Resin Sand Consolidation In Baram Delta, Sarawak. Case Study On Resin Pervormance Versus Internal Gravelpacking With Acid Prepacking*, SPE Paper 57314 presented at the 1999 SPE Asia Pacific Improved Oil Recovery Conference held in Kuala Lumour, Malaysia, Oct. 25–26, 1999.

Cole, S.W., et al., Remedial Proppant Consolidation Using Resin Technology, SPE Paper 52192 presented at the 1999 SPE Mid–Continent Operations Symposium held in Oklahoma City, Oklahoma, Mar. 28–31, 1999.b.

* cited by examiner

METHOD OF COMPLETING A WELL IN AN UNCONSOLIDATED FORMATION

TECHNICAL FIELD OF THE INVENTION

This invention relates to a method of completing a well in a poorly consolidated formation-bearing hydrocarbon to minimize flow of particulates such as sand into a wellbore. The invention proposes a screen-less completion method that can be carried out with coiled tubing equipments.

BACKGROUND OF THE INVENTION

Hydrocarbons (oil, natural gas, etc.) are obtained from a subterranean geologic formation (i.e., a "reservoir") by drilling a well that penetrates the hydrocarbon-bearing formation. This provides a partial flowpath for the hydrocarbon to reach the surface. In order for the hydrocarbon to be "produced," that is travel from the formation to the wellbore (and ultimately to the surface), there must be a sufficiently unimpeded flowpath from the formation to the wellbore. This flowpath is through the formation rock—e.g., sandstone, carbonates—which has pores of sufficient size, connectivity, and number to provide a conduit for the hydrocarbon to move through the formation.

When hydrocarbon is produced from a well, formation particulates may travel with the hydrocarbon from the formation, through the wellbore, to the surface. The presence of formation particulates is especially likely in soft formations comprising sand, sandstone, chalk, or limestone. The travel of particulates with the hydrocarbon is undesirable. Particulates flowing through the wellbore will erode equipment in the wellbore and at the surface, which can make replacement of such equipment necessary. Particulates in the produced hydrocarbon must also be removed before the hydrocarbon can be processed. Also, particulates can come to reside in the wellbore to the point where hydrocarbon production is greatly diminished or completely stopped.

When faced with formations requiring sand management, the choice is typically between the use of sand exclusion devices—that usually include a screen and gravel—or screenless completion technologies.

In the conventional sand-control techniques, typically a screen is placed inside the wellbore casing. Gravel is then packed between the screen and the casing. Gravel packs can also be used open-hole (i.e. in wellbores without a casing), or screens can be used without gravel packs. Placing gravel above the fracture pressure of the formation may be termed a "frac-pack." As hydrocarbons are produced from the formation, they travel through the gravel pack and/or the screen before entering the wellbore. The gravel pack and/or screen inhibit the flow of particulates but, under normal conditions, do not substantially inhibit the production of hydrocarbons. Where the internal diameter of the casing is too small, tubing screen assemblies run on coiled tubing may be applied. However, placing a gravel pack and screen requires specialized equipment and access for electric lines that are not always available, especially with offshore wells. Further, the screen and the gravel pack create a mechanical restriction, may be plugged by scales or eroded by the flow of sand, thereby requiring later expensive re-completions.

Screen-less completions involve consolidating the formation by injecting a consolidating fluid comprising, for example, a resin. They offer the advantage of full bore access, lower skins, and reduce the risk associated with running screens into the wellbore. The economic and logistical advantages associated with screen-less completions have made this approach very desirable.

Conventional consolidating fluids comprise a resin, and optionally a curing agent, a catalyst, and an oil wetting agent. When injected into the formation, the resin (acted upon by the curing agent and catalyst, if present) hardens, causing consolidation of the formation to a rigid state and reduction in the concentration of formation particulates. Consolidating fluids and methods for their use are reported in U.S. Pat. Nos. 5,806,593; 5,199,492; 4,669,543; 4,427,069; and 4,291,766. In practice, resins have been used for many years and are effective for short intervals but are recognized to reduce the permeability of the formation, as discussed by Parlar in SPE 39435. Also resin-coated sands have been used both to repair gravel packs and also to provide sand control in the borehole and perforation tunnel. Combinations of sand and resins have also been used as well as fracture treatments to reduce the drawdown and provide sand control in the formation. (SPE 30467)

International Patent Application 02/04784 teaches the use of flexible gel to consolidate a formation. The consolidating fluid includes a gel component and a gel-forming agent and is injected into the formation under conditions under conditions wherein the consolidating fluid forms a flexible gel, thereby consolidating the formation. According to some embodiments, the consolidated formation is further perforated or fractured.

From U.K. Patent Application No. 2,352,259, it is further known a process for stimulating a hydrocarbon-bearing formation comprising the step of determining the direction of maximum in-situ stress within the formation, perforating the formation in a single vertical plane extending in this direction of maximum stress and performing a propped fracturing treatment with a low viscosity fluid. This technology minimizes the undesirable effect of so-called "near-wellbore tortuosity" and may also be used to minimize productions in weak formations. However, the step of determining the direction of maximum stress requires the use of specific tools, such as an ultrasonic imaging tool, that are not always available especially in some remote locations. Moreover, depending on the type of formations, the interpretation of the logs may be extremely difficult so that there is no practical way of determining the direction of maximum in-situ stress with a good accuracy.

Though screen-less completions are clearly desirable, in practice numeral failures have been reported. Therefore the present invention aims at providing a method of completing a non-completed cased interval in an unconsolidated formation, in particular where the direction of in-situ maximum stress is unknown.

SUMMARY OF THE INVENTION

In one embodiment, the present invention relates to a method of completing an interval of a cased well drilled through incompetent formation comprising a combination of three successive operations: zero-degree phasing perforation of a relatively small portion of the interval to be completed, consolidation of the formation zone around the perforations and injection of a propped fracturing fluid above fracture pressure to create a hydraulic fracture and pack this gap with a proppant held by a proppant flowback-retention agent.

The method according to the invention may be carried out with coiled tubing equipment, therefore offering significant cost savings over conventional completions using a rig and screens as well as providing the opportunity to return to other zones either above or below the producing interval and perform additional rig-less completions without screens. Further the method provides an effective way of completing wells in unconsolidated formations even when the horizontal stress direction is not known.

DETAILED DESCRIPTION OF PREFERRED EMBODIMENTS

Figure 1:
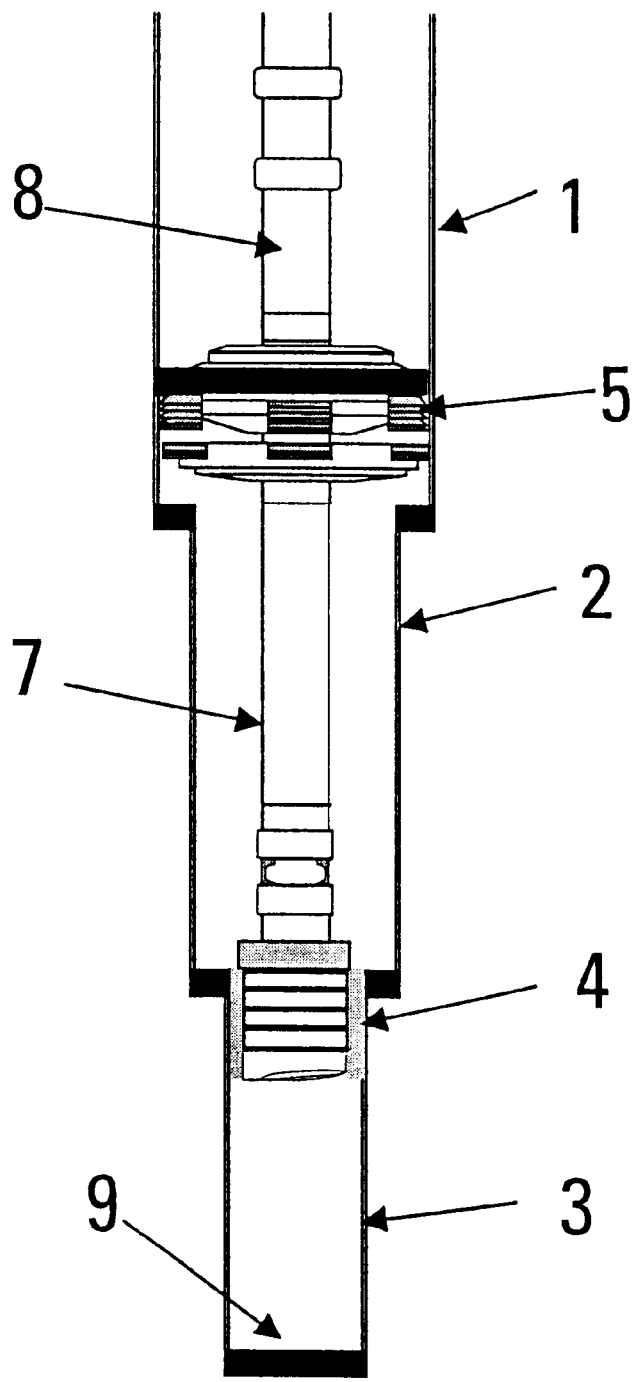
FIG. 1 is a schematic of the wellbore.

The present Invention is particularly applicable in reservoirs that meet certain criteria, in particular relatively high permeability (typically clean sand and permeability preferably greater than 100 milliDarcies or md) and poor stress contrasts in the pay zone. The invention proposes a unique combination of three operations: optimized perforating, formation consolidation using a resin or a gel system and a fracture treatment with proppant-flowback control.

The process starts with perforating the casing in one single direction (0 phasing or 0 and 180-degree phasing). According to a preferred approach, a zero degree phasing is chosen to reduce the possibility of a single out of phase perforations being left unprotected by the proppant after the fracturing step. The perforated interval is preferably limited to a minimum number of shots to minimize the possibility of a single perforation not being protected from sand production. In most cases, no more than half—and most preferably no more than about a third of the height of the pay zone will be perforated. This results in a perforated area in general less than about 7 meters in vertical wells and less than about 3 meters in wells with inclination of more than 20 degrees.

Also the casing entrance hole diameter must not be too small to prevent fracturing with proppant and not too big to allow flow back of the proppant after the treatment. An entrance hole diameter ranging from 0.3" to 0.5" or about 7 mm to about 13 mm is optimal to meet the above requirements and maintain good productivity.

Perforating the consolidated formation can be performed by techniques known in the art. One common way to do this is to lower a perforating gun into the wellbore using a wireline or slickline, to the desired depth, then detonate a shaped charge within the gun. The shaped charge creates a hole through the unconsolidated formation. Perforating guns are comprised of a shaped charge mounted on a base.

The next critical step was to apply a consolidation treatment to the zone around the perforations. Although our fracturing treatment is the primary filter for sand production, if the direction of the minimum and maximum stresses cannot be determined accurately, it is assumed that the fracture would most likely not follow the same direction as the perforation tunnel. The fracture fluid is pumped above fracture pressure to create a gap between the cement and open hole, which is filled with the proppant and packed during the screenout event. If the proppant flowed out of the perforation tunnel there is a risk of sand production through perforation, during production of the reservoir. Hence the need to consolidate the area around the perforation.

According to one embodiment of the present invention, the consolidation treatment is performed using a gel, typically based on an aqueous solution. The solution can comprise buffers, pH control agents, and various other additives added to promote the stability or the functionality of the fluid. In that case the consolidating fluid includes a gel component, capable of forming a gel at least under some downhole conditions for instance by crosslinking of a polymer, or by polymerization of a monomer, preferably in a three-dimensional network, and a gel-forming agent, i.e. a compound or mixture that assists in the formation of a gel from the gel component under at least some downhole conditions Gel components include the following exemplary water-soluble polymers, copolymers, or terpolymers: polyvinyl polymers (such as polyvinyl alcohol or polyvinyl acetate), polyacrylamides, acrylamide copolymers and terpolymers, acrylic acid-methacrylamide copolymers, partially hydrolyzed polyacrylamides, polymethacrylamides, partially hydrolyzed polymethacrylamides, cellulose ethers, polysaccharides, heteropolysaccharides, lignosulfonates, polyalkyleneoxides, carboxycelluloses, carboxyalkylhydroxyethyl celluloses, hydroxyethylcellulose, galactomannans, substituted galactomannans, the ammonium salts or alkali metal salts of the foregoing, and alkaline earth salts of lignosulfonates, among others. Exemplary water-soluble polymerizable monomers that can be used as a gel component include acrylic acid, acrylamide, methacrylic acid, methacrylamide, hydroxyethylacrylate, maleic acid, diallyldimethyl ammonium chloride, methylene bisacrylamide, urea, vinyl acetic acid, styrene sulfonic acid, salts thereof, or mixtures thereof. Neither list is intended to be exhaustive The concentration of a polymeric gel component in the consolidating fluid is from about 1 wt % to about 10 wt % gel component, preferably about 4 wt % to about 8 wt % gel component, more preferably about 5 wt % to about 7 wt % gel component. The concentration of a monomer gel component is from about 2 wt % to about 60 wt %, preferably from about 5 wt % to about 45 wt %, more preferably from about 15 wt % to about 30 wt %.

If the gel component is a polymer, the gel-forming agent is preferably a crosslinking agent, i.e. an agent capable of crosslinking polymer molecules to form a three-dimensional network. Exemplary organic crosslinking agents include, but are not limited to, aldehydes, dialdehydes, phenols, substituted phenols, and ethers. Exemplary inorganic crosslinking agents include, but are not limited to, polyvalent metals, chelated polyvalent metals, and compounds capable of yielding polyvalent metals. If the gel component is provided as a monomer, the gel-forming agent is preferably able to crosslink the monomer or catalyze the polymerization of the monomer to form a three-dimensional network.

The concentration of the gel-forming agent in the consolidating fluid is typically about 0.001 wt % to about 5 wt %, preferably about 0.005 wt % to about 2 wt %, more preferably about 0.01 wt % to about 1 wt %.

According to another embodiment of the invention, the consolidating fluid comprises a resin and optionally, a curing agent, a surfactant or mixture of surfactants a catalyst, an oil-wetting agent, a coupling agent, or any combination thereof. The resin can be any resin known to be useful in consolidation of a subterranean formation. The resin can comprise a furan, a polyurethane, or an epichlorohydrin polymer. (By "resin comprising a polyurethane" is meant a resin comprising low molecular weight polymers of polyether, aliphatic polyester, or polybutadiene that generate the polyurethane upon setting). Preferably, the resin comprises bisphenol A-epichlorohydrin polymer.

The curing agent can be any agent known to promote setting of the resin under the pressure and temperature conditions found in the subterranean formation. If the resin comprises bisphenol A-epichlorohydrin polymer, preferably, the curing agent comprises 4,4-methylenedianlline. If the resin comprises a polyurethane as defined above, the curing agent is preferably a diisocyanate. In the embodiment comprising bisphenol A-epichlorohydrin resin and 4,4-methylenedianlline curing agent, an amine phenol derivative may be further added as catalyst to promote the activity of the curing agent to set the resin under the pressure and temperature conditions found in the subterranean formation.

If the resin is a furan according to a preferred embodiment, a curing agent is optional, as furans are capable of autopolymerization though it is often recommended to include a catalyst to promote autopolymerization of the furan. Preferably, the catalyst comprises an acid catalyst, such as toluene sulfonic acid, hydrochloric acid, sulfuric acid, nitric acid, oxalic acid, iodic acid, maleic acid, chloroacetic acid, dichloroacetic acid, trichloroacetic acid, phosphoric acid, o-nitrobenzoic acid, benzoic acid, acetic acid, or adipic acid.

The resin, curing agent, and optional catalyst can each comprise additional compounds known to be useful in the production, storage, or processing of the active ingredients. For example, if the resin comprises an epichlorohydrin polymer, the resin can also comprise about 30–40% by weight 2-(2-methoxyethoxy)ethanol and about 1–5% xylene. On the other hand, if the resin comprises a furan, the resin can also comprise butyl acetate or furfuryl acetate as a solvent to reduce viscosity and remove water generated by the condensation of the furan. The curing agent, for example, can comprise about 30–40% by weight 2-(2-methoxyethoxy)ethanol and about 10% by weight glycidoxypropyl trimethoxysilane. The catalyst can comprise about 16% phenol. Other additives can be present as well. A particularly useful additive is an oil wetting surfactant. Another useful additive is a coupling agent, such as a silane.

After the formation has been consolidated according to the present invention, the permeability of the formation is reduced. According to a preferred embodiment of the invention, the consolidating treatment is such that this reduction of permeability of the formation is no more than about 90% so that the production does not rely entirely on the communication between the formation and the wellbore established by the fracturing step. Non-flexible resins, in particular, furan-based resins are typically preferred over gels that render the formation relatively impermeable.

The consolidating fluid can further comprise stabilizing agents, surfactants, diverting agents, buffers, pH control agents, and various other additives added for instance to promote the stability or the functionality of the fluid, as it is well known in the art. While the compositions of the present invention are described herein as comprising certain materials, it should be understood that the composition can optionally comprise two or more chemically different such materials. It should be also noted that all of the components of the consolidating system are not necessarily pumped simultaneously. For instance, where a furan-based resin is used, the acid catalyst is preferably pumped in a succeeding stage, with eventual intermediate overflush stages.

Techniques for injection of consolidating fluids are also well known in the art. Typically, a consolidating fluid is injected through the wellbore into the formation at a pressure less than the fracturing pressure of the formation. The volume of consolidating fluid to be injected into the formation is a function of the formation pore volume to be treated and the ability of the consolidating fluid to penetrate the formation and can be readily determined by one of ordinary skill in the art. As a guideline, the formation volume to be treated relates to the height of the desired treated zone and the desired depth of penetration, and the depth of penetration is preferably at least about 30 cm radially into the formation. Note that since the consolidation fluid is injected through the perforations, the treated zone actually stems from the aligned perforations.

Before consolidating the formation, according to a preferred embodiment, an acid treatment is performed by injection of an acidic fluid. As it is well known in the art, this acidic treatment typically includes several stages such as an acid preflush, one or more stages of acid injection and an overflush.

After the perforation and the consolidation, the final step is the fracturing step. Although a resin treatment alone may have been sufficient in preventing early sand production the resin reduces the permeability of the formation around the wellbore. The primary purpose of the fracture treatment is to connect the wellbore to the formation and in doing so by pass any damage and act as a filter allowing the production of hydrocarbons while holding back formation material. The high surface area associated with a fracture makes it a very effective filter, for example, a 13.7 m fracture length with 56 cm height has a surface area of 368 $m^2$, compared to the open hole flow area for a gravel pack of 3.2 $m^2$ with the same zone height.

Techniques for hydraulically fracturing a subterranean formation will be known to persons of ordinary skill in the art, and will involve pumping the fracturing fluid into the borehole and out into the surrounding formation. The fluid pressure is above the minimum in situ rock stress, thus creating or extending fractures in the formation. In order to maintain the fractures formed in the formation after the release of the fluid pressure, the fracturing fluid comprises a proppant.

Suitable proppants include, but are not limited to, sand, bauxite, glass beads, and ceramic beads and resin-coated sand. Proppant will typically be from about 8 to about 100 U.S. Standard Mesh in size. Mixtures of suitable proppants can be used. The concentration of proppant in the fracturing fluid can be any concentration known in the art, and will typically be in the range of about 0.5 to about 20 ppa (pounds of proppant added) per gallon of clean fluid. Preferably, the fracturing fluid contains a proppant-retention agent, e.g. a fibrous material, a curable resin coated on the proppant, platelets, deformable particles, or a sticky proppant coating, to trap proppant particles in the fracture and prevent their production through the wellbore. Fibers, in concentration that preferably ranges from about 0.1% to about 5.0% by weight of proppant, for example selected from natural organic fibers, synthetic organic fibers, glass fibers, carbon fibers, ceramic fibers, inorganic fibers, metal fibers and mixtures thereof, in combination with curable-resin-coated proppants are particularly preferred. An exemplary proppant-retention agent is commercially available as PropNET™ (Schlumberger). The proppant-retention agent keeps the proppant in the fracture, and the proppant and proppant-retention agent keep formation particles from being produced.

Proppant-based fracturing fluids typically also comprise a viscosifier, such as a solvatable polysaccharide or a viscoelastic surfactant, to provide sufficient viscosity to transport the proppant. Other viscosifiers known in the art can be used instead of or in addition to the two listed above. In pumping the fracturing fluid into the borehole, it is most economical for the fluid to have as low a viscosity as possible, to minimize the energy expenditure of pumping. On the other hand, some viscosity is required to transport proppant. One of ordinary skill in the art will be able to determine, based on the proppant and other variables, what viscosity increase (through the addition of solvatable polysaccharide or viscoelastic surfactant) is desired.

According to a preferred aspect of the invention, the fracture is design to promote a tip screen out to create a short wide fracture. Failure to achieve a tip screen out may result in higher skins and reduced efficiency for the fracturing treatment.

The invention is preferably carried out with coiled tubing equipment. Coiled tubing provides a better accuracy of the placement and a dedicated work string that prevents contamination of the fluid. The fracture treatment may also be performed using coiled tubing, in particular for offshore treatment. That way, neither the safety valve nor the Christmas tree is at risk to be damaged during the performance of the job. Where multiple zones of the formations need to be treated, it is further advantageous to isolate them using isolation packers run on coiled tubing. After the fracturing treatment, a wash treatment is preferably performed to remove the excess of proppant in the wellbore. This wash treatment is also preferably carried out using a coiled tubing equipment.

The invention will be further understood by the following description of a case study, made with reference to the attached drawings I. Reservoir Characterization This study involves a well located offshore Louisiana. The well is a caisson with a well-guard and cannot support interventions from the structure. After drilling directionally and logging the well the resistivity and gamma ray induction logs confirmed a clean 22' sand extending from 11772' to 11794', the logs indicated oil and some gas and side wall cores indicated the zone to be oil bearing. The well is drilled through a compartmentalized sandstone formation around a salt dome. It is clean sand with an average porosity of 28% and permeability 100–500 md. Measurements made on side wall core samples gave air permeability ranging from 830 to 1200 md in the sand and porosity 29% with oil.

Table 1 shows some of the reservoir properties:

TABLE 1

| Well Type | Oil |
|---|---|
| Formation Type | Sandstone |
| Deviation Across Interval | 40 degrees |
| Bottom Hole Static Temp (F.) | 200 F. |
| Porosity (%) | 29% |
| Permeability (md) | 100 md |
| Net H (ft) | 22 ft |

Due to earlier experience in the same field, sand control was believed to be necessary. A standard gravel pack completion was planned for the well with a 5" liner, 20/40 gravel, 2⅞" screens and 2⅞" production tubing but the 5" liner was cemented in place after it became differentially stuck due to hole angle and pressure depleted zones above the target sand. Therefore a 3½" liner was run in the 6.5" open hole to TD at 12,100' and the planned gravel pack completion was no longer suitable due to the limited internal diameter (ID) of the 3½" liner. FIG. 1 is a wellbore schematic that shows the 7" casing 1, the 5" liner 2 and the 3½" liner 3 designed with a Polished Bore Receptacle or PBR 4 at the top of the liner to allow a seal assembly to be stung into this PBR. The assembly further includes a 7" packer assembly 5 and 2⅞" tubing 6 and 7, respectively above and below the packer 5 and designed to allow for a through tubing fracture. Tubing movement calculations were made to ensure the seal assembly and packer would remain in place during the fracturing job. FIG. 1 further shows the top of cement 8.

II. Perforation

The selected gun produces a 0.33" diameter entrance hole in 3½" casing with 19" of total penetration. The perforated interval length was optimized using NODAL analysis and it was interesting to note that perforating just 6' of the 22' zone still provide 500 bopd production rates with a drawdown of less than 100 psi. Also to ensure all the perforations are connected to the frac zero degree phasing was chosen, this reduces the possibility of a single out of phase perforations being left unprotected by the proppant.

III. Consolidation

From a model, it was estimated that the perforation penetrates 17" into the formation, around the perforation tunnel is a crushed zone and beyond that a transition zone to virgin rock. It was thus assumed that a fracture would most likely NOT follow the same direction as the perforation tunnel.

A Furan Resin was chosen for this case, resins have been used for many years to consolidate weak formations. The sequence of fluids detailed in table 2 was pumped through 1½" Coiled Tubing followed by a 12 hour planned shut in to allow time for the resin to cure. The Coiled Tubing provided a clean dedicated work string with accurate displacement volumes allowing precision placement of the fluids. The acid and resin treatment were pumped at 1 bpm with a maximum surface pressure of 6500 psi.

TABLE 2

| Stage | Fluid | Volume |
|---|---|---|
| Acid Pre Flush | 6% Ammonium Chloride | 600 gal |
| HCL Acid | 10% HCl + additives | 900 gal |
| Mud Acid | 9/1 Mud Acid | 900 gal |
| Overflush | 6% Ammonium Chloride | 1460 gal |
| Resin | Furan Resin | 240 gal |
| Overflush | 6% Ammonium Chloride | 1040 gal |
| Acid Catalyst | 10% HCl + additives | 1200 gals |

IV. Fracturing

The primary purpose of the fracture treatment is to connect the wellbore to the formation and in doing so by pass any damage and act as a filter allowing the production of hydrocarbons while holding back formation material.

A preliminary fracture design was developed using Schlumberger FraCADE simulator. Proppant selection was another key step in the process, 20/40 proppant was sized from offset sieve analysis and a stress cured resin-coated ceramic proppant was chosen due to stress environment (8000 psi Closure Pressure) and the need to prevent proppant flow back after the fracture treatment. In addition a 1.5% fiber additive was used through out the proppant stages to assist preventing flow back of the pack. Stress cured resin-coated proppant has the advantage of requiring the stress associated with fracture closure to bond the proppant grains together.

A low guar borate crosslinked fracturing fluid and a pad of 700 gals was designed to be continuous mixed ramping up from 2 PPA to 8 PPA as per the pumping schedule in Table 3 below. The fracturing design was finalized after a calibration test pumped at a constant rate of 10 BPM to determine the fracture geometry. A mini-frac was performed during which a proppant-free fracturing fluid was bullheaded into the tubing at 5–6 BPM and as the calibration fluid reached the perforations, the rate was increased to 10 BPM. After monitoring the pressure decline, the data was analyzed in order to determine the fluid performance and reservoir properties. Based upon the results, the schedule shown in table 3 was adopted. The actual schedule (in perforations) is shown table 4:

TABLE 3

| Stage Name | Pump Rate | Stage Fluid Volume | Stage Slurry Volume | Stage Prop | Cumulative Time |
|---|---|---|---|---|---|
| Pad | 10.0 | 1,026 | 24.4 | 0 | 2.4 |
| 0.5 PPA | 10.0 | 400 | 9.7 | 200 | 3.4 |
| 1.2 PPA | 10.0 | 433 | 10.9 | 519 | 4.5 |
| 2.2 PPA | 10.0 | 415 | 10.8 | 912 | 5.6 |
| 3.3 PPA | 10.0 | 398 | 10.9 | 1313 | 6.7 |
| 4.4 PPA | 10.0 | 382 | 10.9 | 1680 | 7.8 |
| 5.5 PPA | 10.0 | 367 | 10.9 | 2016 | 8.9 |
| 6.7 PPA | 10.0 | 352 | 10.9 | 2356 | 9.9 |
| 8.0 PPA | 10.0 | 500 | 16.2 | 4000 | 11.6 |

TABLE 4

| Stage Name | Pump Rate | Stage Fluid Volume | Stage Slurry Volume | Stage Prop | Cumulative Time |
|---|---|---|---|---|---|
| Pad | 10.0 | 1,026 | 24.4 | 0 | 2.4 |
| 0.5 PPA | 10.0 | 400 | 9.7 | 200 | 3.4 |
| 1.2 PPA | 10.0 | 433 | 10.9 | 515 | 4.5 |
| 2.2 PPA | 10.0 | 415 | 10.9 | 930 | 5.6 |
| 3.3 PPA | 10.0 | 398 | 10.9 | 1309 | 6.7 |
| 4.4 PPA | 6.0 | 382 | 10.9 | 1673 | 7.8 |
| 5.5 PPA | 6.0 | 367 | 10.9 | 2026 | 8.9 |
| 6.7 PPA | 5.0 | 352 | 10.9 | 2365 | 9.9 |
| 8.0 PPA | 3.0 | 10 | 0.3 | 80 | 10.0 |

Figure 2:
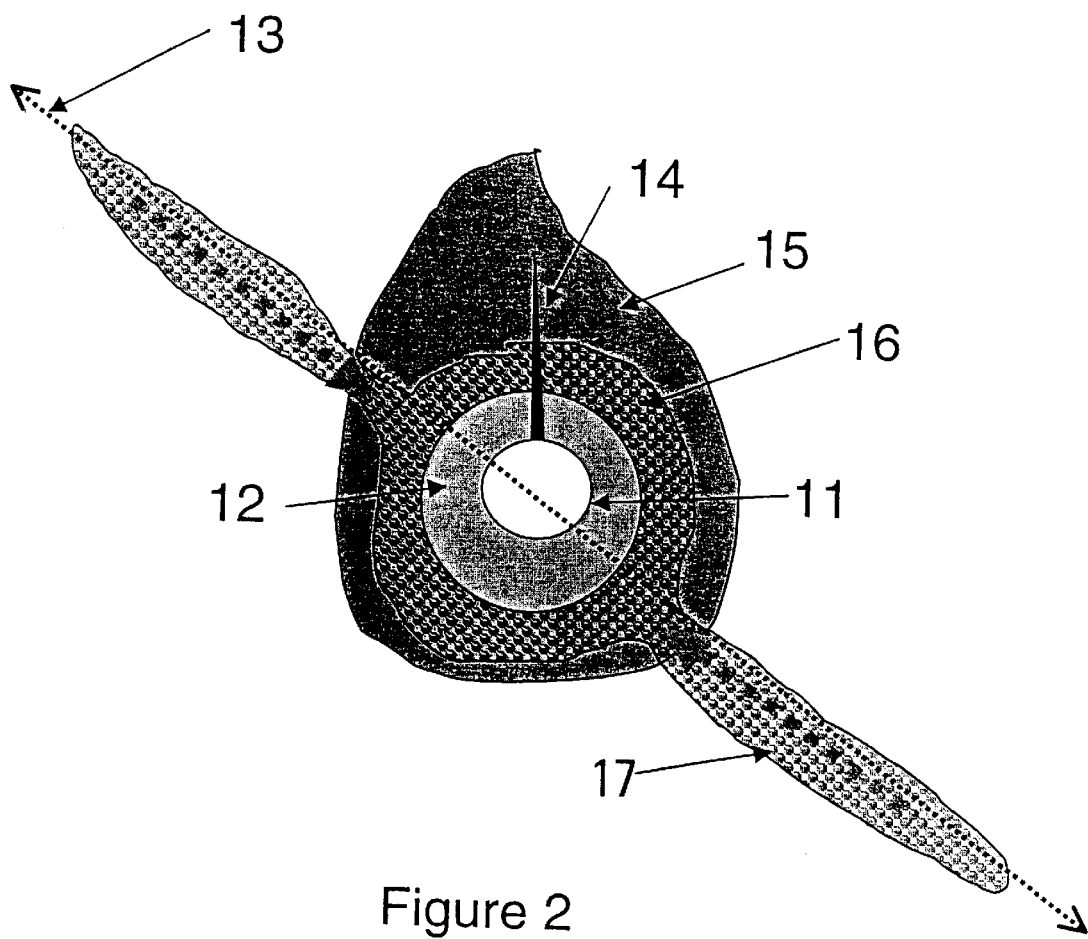
FIG. 2 shows a cartoon of the final configuration around the wellbore with linear flow through the fracture and radial flow through the formation into the wellbore via the perforation.

FIG. 2 shows a cartoon of the final configuration around the wellbore with linear flow through the fracture and radial flow through the formation into the wellbore via the perforation. The liner 11 was provided with a cemented sheath 12 to provide zonal isolation. The wellbore is located in an unconsolidated formation having a direction of maximal stress represented by the arrow 13. However, this direction may remain unknown due to poor contrast. According to the invention, all perforations 14 are made in the same direction, assumed to be different than the direction 13. The consolidating fluid is injected through the perforations to consolidate the area 15. The last step is to create a fracture—that will follow the direction of the maximal stress and to prop not the fracture and the area 16 around the cement sheath 12, thereby creating a path for the oil.

The job proceeded well, with indications of a good net pressure build during the treatment. The calculated bottom-hole pressure based on the treating pressure indicated a net pressure increase. During the treatment, the pressure climbed very close to the predetermined maximum of 7,000 psi. The pressure was changed to 8,500 psi to overcome the fracture initiation pressure of roughly 7,700-psi surface pressure. Tip screen out was achieved as evidenced by a net pressure increase towards the end of the job.

The well was initially flowed back to surface and tested immediately after the fracturing treatment. Once the well had unloaded the fracturing fluid and rates have been established it was shut in to finish hooking up the 4" flow line back to the host platform. Initial rates were very encouraging with 535 bopd and over 4.0 mmcfpd gas and 3700 psi flowing tubing pressure. The well was put on production 3 weeks after and production stabilized at around 500 bopd and 2.5 mmcfpd with a flowing tubing pressure of 3500 psi and no sand production.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A method of completing a non-completed interval provided with a cemented casing in a subterranean well, said interval drilled in an unconsolidated formation, the method comprising the succeeding steps of:

a. perforating a portion of the interval length, wherein all the perforations are oriented in the same direction; then b. performing a consolidation treatment to the zone of the formation around the perforations and then;

c. pumping a viscous fracturing fluid into the consolidated formation, through the perforations, at a rate and pressure sufficient to hydraulically fracturing the subterranean formation, wherein at least a portion of the fracturing fluid comprises a proppant and a proppant flowback-retention agent and wherein the injection and pressure rate of the injected fracturing fluid is selected so as to promote a screening out of the fracture at the tip to create a short wide fracture.

2. The method of claim 1, wherein the step of perforating the formation is performed at a zero-degree phasing.

3. The method of claim 1, further comprising an acidizing step between the step of perforating and the step of consolidating the formation.

4. The method of claim 3, wherein the step of acidizing comprises a pre-flush step, at least one acid step and optionally, an overflush.

5. The method of claim 1, wherein the height of the perforated portion of the completed interval is less than half the interval length.

6. The method of claim 5, wherein the height of the perforated portion of the completed interval is about a third of the interval length.

7. The method of claim 1, wherein the height of the perforated portion of the completed interval is less than 7 meters.

8. The method of claim 1, wherein the well has an inclination of more than 20 degrees towards the vertical and the height of the perforated portion of the completed interval is less than 3 meters.

9. The method of claim 1, wherein the entrance hole diameter of the perforations, near the casing, has a diameter ranging from about 7 mm to about 13 mm.

10. The method of claim 1, wherein the permeability of the consolidated formation after the consolidation treatment is at least 10% of the permeability before consolidation.

11. The method of claim 1, wherein the consolidation treatment is performed with a curable resin.

12. The method of claim 11, wherein the consolidation treatment comprises first the injection of the curable resin, then an optional overflush treatment and the injection of a curing or catalytic agent.

13. The method of claim 12 wherein the resin is a furan resin and the catalytic agent is an acid catalyst.

14. The method of claim 11, wherein the resin is a furan resin.

15. The method of claim 1, wherein the proppant has a size ranging from 8 to 100 U.S. mesh and is selected from a group consisting of sand, resin-coated sand, ceramic beads, synthetic organic beads, glass microspheres, resin coated proppant and sintered minerals.

16. The method of claim 1, wherein the proppant-flowback retention agent comprises a fibrous material.

17. The method of claim 16 wherein the fibrous material is selected from a group consisting of natural organic fibers, synthetic organic fibers, glass fibers, carbon fibers, ceramic fibers, inorganic fibers, metal fibers and mixtures thereof.

18. The method of claim 16, wherein the fiber concentration ranges from 0.1% to 5.0% by weight of proppant.

19. The method of claim 1, wherein the steps of perforating, consolidating and fracturing are carried out using coiled tubing equipment.

* * * * *